(12) United States Patent
Hamilton et al.

(10) Patent No.: US 10,423,927 B2
(45) Date of Patent: Sep. 24, 2019

(54) ELECTRONIC PROCESS-ENABLED COLLABORATION SYSTEM

(75) Inventors: Mary Elizabeth Hamilton, San Francisco, CA (US); Michael A. Holzman, Chicago, IL (US); Louis Charles Nebolsky, Northbrook, IL (US); Atul K. Kapur, Naperville, IL (US)

(73) Assignee: Accenture Global Services Limited, Dublin (IE)

( * ) Notice: Subject to any disclaimer, the term of this patent is extended or adjusted under 35 U.S.C. 154(b) by 1032 days.

(21) Appl. No.: 12/537,830

(22) Filed: Aug. 7, 2009

(65) Prior Publication Data

US 2011/0035323 A1    Feb. 10, 2011

(51) Int. Cl.
G06Q 10/10    (2012.01)
G06Q 10/06    (2012.01)

(52) U.S. Cl.
CPC .......... *G06Q 10/10* (2013.01); *G06Q 10/06* (2013.01); *G06Q 10/103* (2013.01)

(58) Field of Classification Search
CPC ....... G06Q 10/10; G06Q 10/103; G06Q 10/06
USPC .......... 705/301; 709/204; 707/792, E17.044, 707/E17.032
See application file for complete search history.

(56) References Cited

U.S. PATENT DOCUMENTS

| | | | |
|---|---|---|---|
| 2002/0157017 A1 | 10/2002 | Mi et al. | 713/200 |
| 2003/0061330 A1* | 3/2003 | Frisco et al. | 709/223 |
| 2003/0078874 A1* | 4/2003 | Cope | 705/37 |
| 2004/0045000 A1* | 3/2004 | Hara | G06F 8/61 717/178 |
| 2004/0143477 A1* | 7/2004 | Wolff | 705/9 |
| 2004/0186762 A1* | 9/2004 | Beaven et al. | 705/8 |
| 2005/0027585 A1* | 2/2005 | Wodtke et al. | 705/9 |
| 2005/0095569 A1* | 5/2005 | Franklin | 434/350 |
| 2005/0203757 A1* | 9/2005 | Lei | G06Q 10/06 705/7.27 |
| 2006/0195778 A1* | 8/2006 | Bendik | 715/500 |
| 2008/0148159 A1* | 6/2008 | Kogan | G06Q 10/06 715/753 |
| 2010/0057522 A1* | 3/2010 | Borowski | G06Q 10/06 705/301 |

(Continued)

FOREIGN PATENT DOCUMENTS

CA    2559041    * 10/2005
CN    1926515    * 3/2007

(Continued)

OTHER PUBLICATIONS

Dedicated MOSS 2007 Server, pp. 1-4 (Year: 2007).*

(Continued)

*Primary Examiner* — Tad D Nguyen
(74) *Attorney, Agent, or Firm* — Brinks Gilson & Lione (57) ABSTRACT

A process-enabled collaboration system integrates the collaboration tools and applications needed for a remote project into a single portal. The collaboration system identifies the type of project to be performed, and generates a custom collaboration site tailored to the specific project. The custom collaboration site provides a convenient and direct relationship between remote members of a project team and the collaborative tools and information they will use.

24 Claims, 10 Drawing Sheets

(56) References Cited

U.S. PATENT DOCUMENTS

2010/0082691 A1* 4/2010 Jaster .............. G06F 17/30734
707/792
2011/0283104 A1* 11/2011 Sangubhatla ....... H04L 63/0823
713/168
2012/0054270 A1* 3/2012 Foreman ............. G06Q 10/10
709/203

FOREIGN PATENT DOCUMENTS

| EP | 1 619 618 A1 | 1/2006 |
|---|---|---|
| EP | 1 699 009 A1 | 9/2006 |

OTHER PUBLICATIONS

First Examiner's Report for Australian Application No. 2010206022 dated Mar. 30, 2011 (3p).
European Search Report for EP Application No. 11183845.4 dated Dec. 30, 2011 (7p).
Office Action in Canada Application No. 2,711,082, dated Oct. 2, 2018, pp. 1-5.

* cited by examiner

ELECTRONIC PROCESS-ENABLED COLLABORATION SYSTEM

1. TECHNICAL FIELD

This application relates to electronic collaboration tools and applications. In particular, this application relates to seamless integration of collaboration tools and applications into a process-enabled collaboration portal.

2. BACKGROUND

The team collaboration environment, such as those used to perform management consulting services, uses personnel and resources of various areas of expertise that are suited to serve a client's needs. In bringing in the best talent suited to address the client's needs, members of a project team are often centered at various locations throughout the world. A particular project team, for example, may include team members in Europe, the United States, and India, each providing valuable skills to the project.

Collaboration and coordination between remote members of the project team can cost time and money, affecting the overall efficiency and quality of the project. For some client projects, the costs of collaboration and coordination may even restrict the talent pool from which potential team members can be drawn. With a project team assembled, a variety of collaboration tools and portals are often provided to assist a project team in accomplishing a client project, thought little direction is generally provided as to how and when to effectively use them during the project.

Therefore, a need exists to address the problems noted above and others previously encountered.

SUMMARY

A process-enabled collaboration system integrates the collaboration tools and applications needed for a remote project into a single portal. The collaboration system identifies the type of project to be performed, and generates a custom collaboration site tailored to the specific project. The custom collaboration site provides a convenient and direct relationship between remote members of a project team and the collaborative tools and information they will use.

Other systems, methods, features and advantages will be, or will become, apparent to one with skill in the art upon examination of the following figures and detailed description. All such additional systems, methods, features and advantages are included within this description, are within the scope of the invention, and are protected by the following claims.

BRIEF DESCRIPTION OF THE DRAWINGS

The system may be better understood with reference to the following drawings and description. The elements in the figures are not necessarily to scale, emphasis instead being placed upon illustrating the principles of the type model. In the figures, like-referenced numerals designate corresponding features throughout the different views.

DETAILED DESCRIPTION

Figure 1:
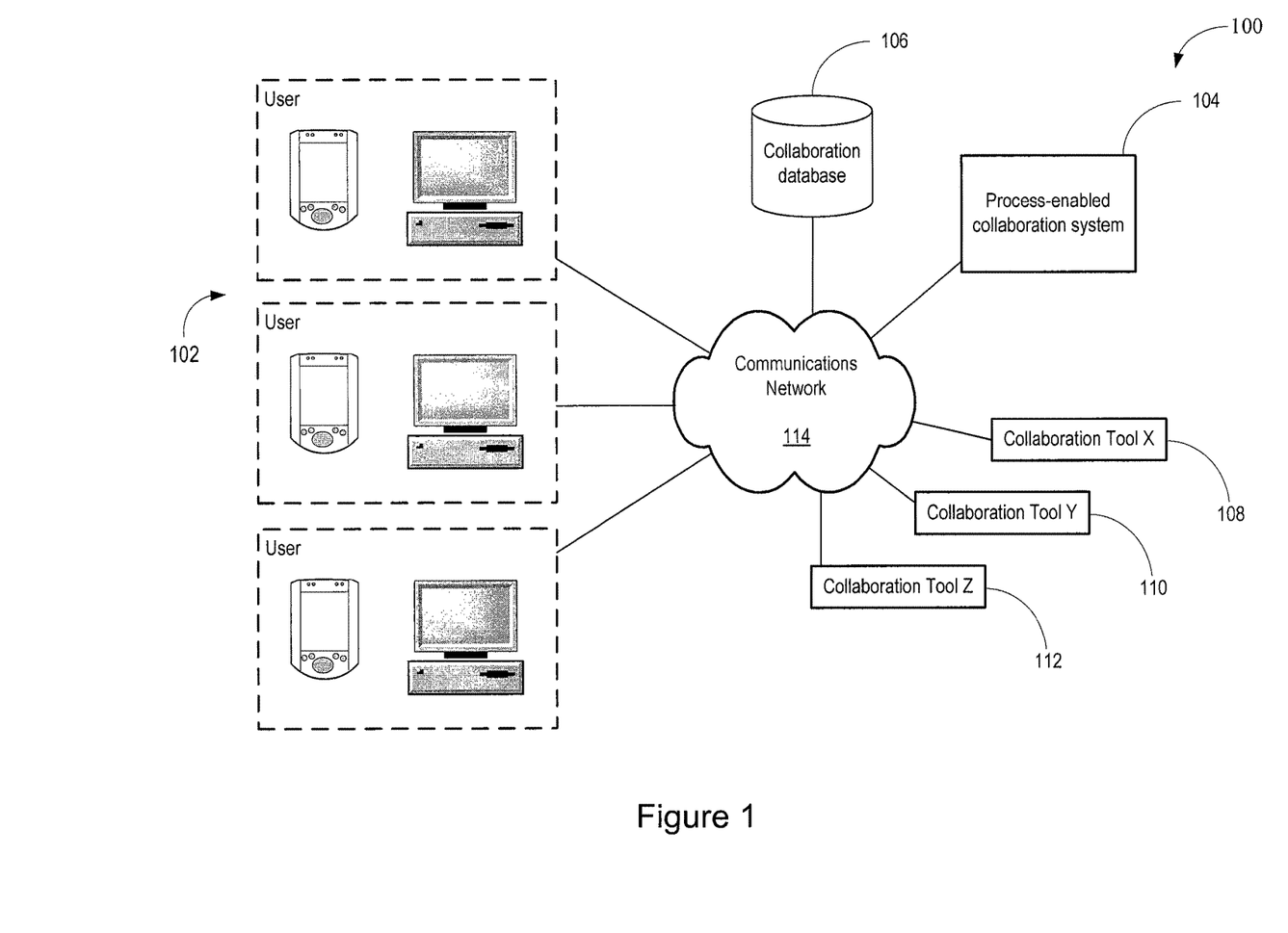
FIG. 1 shows an architecture for integrating the resources used for management consulting projects.

FIG. 1 shows an architecture 100 for integrating the resources used for remote client service projects. For the sake of explanation, the disclosed architectures, systems, and methods are described in the context of management consulting projects. It will be appreciated, however, that the process-enabled collaboration system described herein may be used to integrate collaboration tools and resources used for collaborative projects related to other types of services.

The architecture 100 includes user portals 102, a process-enabled collaboration system 104, a process-enabled collaboration database 106, and collaboration tools 108-112. The user portals 102 correspond to members of a project team performing a client project. The collaboration tools 108-112 correspond to a set of applications the project team may use in accomplishing the client project. The process-enabled collaboration system 104 identifies which of the collaboration tools 108-112 the project team will need for a particular project and automatically integrates the identified collaboration tools into a process-enabled collaborative portal. The process-enabled collaborative portal is a single portal that supports a direct relationship between the members of the project team and the collaboration tools they will use. The user portals 102 may interact remotely with the process-enabled collaborative portal generated by the process-enabled collaboration system through a communications network 112.

The communications network 114 may be any private or public communications network or combination of networks. The communications network 114 may be configured to couple one computing device, such as a server, system, database, or other network enabled device, to another device to enable communication of data between computing devices. The communications network 114 may generally be enabled to employ any form of computer-readable media for communicating information from one computing device to another. The communications network 114 may include one or more of a wireless network, a wired network, a local area network (LAN), a wide area network (WAN), a direct connection such as through a Universal Serial Bus (USB) port, and the like, and may include the set of interconnected networks that make up the Internet. The communications network 114 may include any communication method by which information may travel between computing devices.

The user portals 102 may access the process-enabled collaborative portal via the communications network 114 using a standard browser application. A browser based implementation allows system features to be accessible regardless of the underlying platform of the user portals 102. For example, the user portals 102 may each be a desktop, laptop, handheld computer, cell phone, mobile messaging device, network enabled television, digital video recorder, automobile, or other network enabled user portal, which may use a variety of hardware and/or software packages. The user portals 102 may connect to the process-enabled collaborative portal using a stand-alone application which may be platform-dependent or platform-independent. Other methods may be used to implement the user portals 102.

The process-enabled collaboration database 106 stores project templates corresponding to different types of management consulting projects. Each project template identifies the phases and activities of a particular project. A Strategy project, for example, may include four phases, while a Supply Chain project may include seven phases. Each phase may include one or more activities to be accomplished during the phase. The project template identifies the collaboration tools that will be used during a particular project, as well as which collaboration tools are relevant to which phases and activities of the project. For example, the Strategy project may use collaboration tools 108 and 112, while a Supply Chain project may use collaboration tools 108 and 110. In addition, the project template may include information indicating that in a Strategy project, collaboration tool 108 is relevant to the Data Gathering phase. Based on this information, process-enabled collaborative portal may provide users with instructions or notices about the collaboration tool 108 when the project reaches the Data Gathering phase. The collaboration tools 108-112 may include, for example, office suites (e.g., MS Office), real-time web-based collaborative services (e.g., virtual whiteboard), instant messaging clients (e.g., Office Communicator), web conferencing services (e.g., Live Meeting), or other applications related to and used throughout the management consulting process.

The process-enabled collaboration system 104 receives a process-enabled collaborative portal provisioning request along with provisioning data that identifies type of project to be performed. The process-enabled collaboration system 104 may look up the project template that corresponds to the project to be performed and generate the process-enabled collaborative portal based on the corresponding project template.

Figure 2:
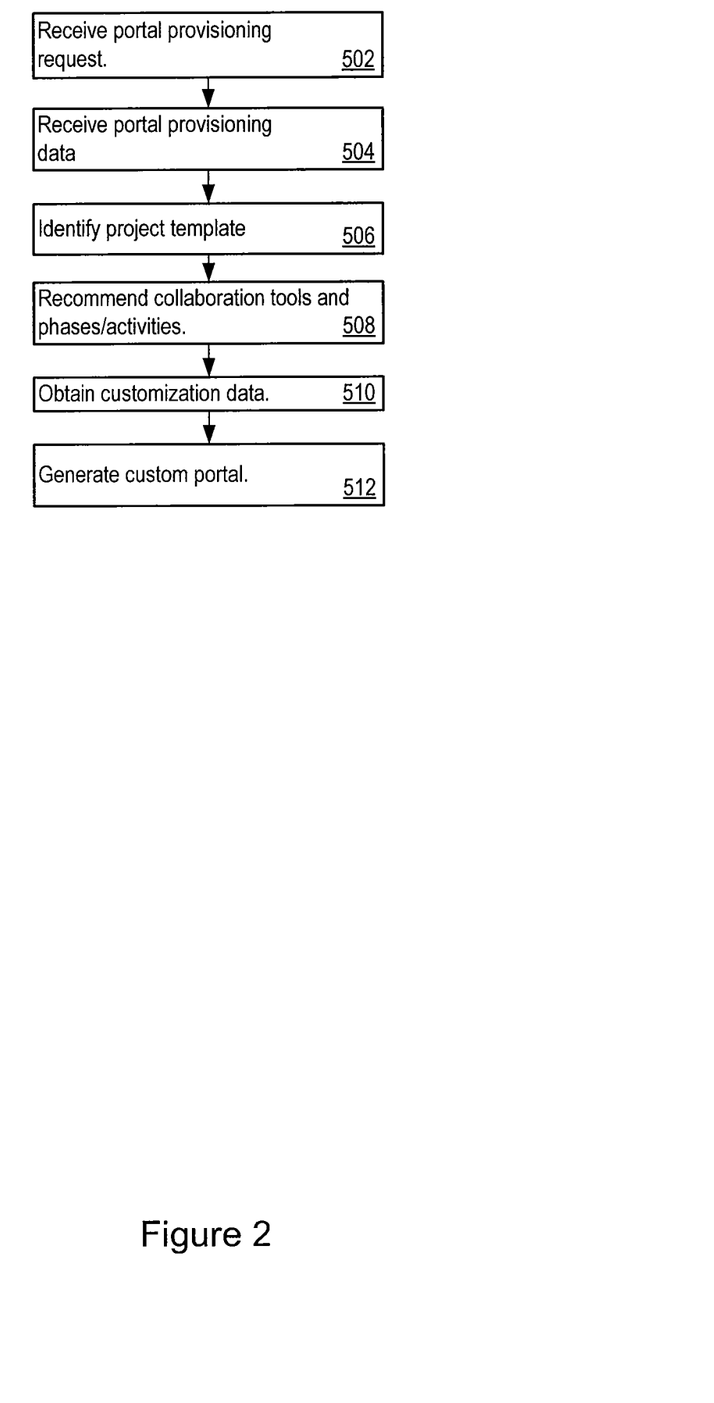
FIG. 2 shows a flow diagram of creation of a process-enabled collaborative portal.

FIG. 2 shows a flow diagram 200 of process-enabled collaborative portal creation by a process-enabled collaboration system. The process-enabled collaboration system receives a process-enabled collaborative portal provisioning request (202). A manager or other user may submit, via a user interface, a request for a process-enabled collaborative portal. The user interface may be part of a provisioning wizard provided by the process-enabled collaboration system.

The process-enabled collaboration system receives process-enabled collaborative portal provisioning data (204). The provisioning data may include information identifying the type of project to be performed (e.g., Strategy project, Supply Chain project, etc), the name of the project, an expiration date of the project, and other information defining the client project. The provisioning data may also include information identifying the members of the project team. The process-enabled collaboration system may provide a user interface through which a manager or other user may submit the provisioning data.

The process-enabled collaboration system identifies a project template stored on a database or other data storage device that corresponds to the type of project to be performed (206). The database or other data storage device may include multiple project templates associated with different types of projects. Each project template identifies the phases of a particular project. A Strategy project, for example, may include four phases, while a Supply Chain project may include seven phases. The project template identifies the collaboration tools that will be used during a particular project, as well as which collaboration tools are relevant to phases of the project. When the process-enabled collaboration system receives the information identifying the type of project to be performed, the system looks up the corresponding project template to determine which collaboration tools, phases and activities to recommend.

The process-enabled collaboration system recommends a set of collaboration tools and phases and activities based on the information identifying the type of project (208). The process-enabled collaboration system may present to the manager or other user a list of recommended collaboration tools for the particular project. The process-enabled collaboration system may also present to the manager or other user a list of the phases for a particular project, as well as a list of the activities associated with each phase.

The process-enabled collaboration system receives process-enabled collaborative portal customization data (210). The process-enabled collaboration system may allow the manager or other user to customize the process-enabled collaborative portal beyond the recommended collaboration tools and phases and activities. For example, the process-enabled collaboration system may receive from the manager or other user information adding collaboration tools to, or removing collaboration tools from, the set of tools recommended by the system. The process-enabled collaboration system may also receive information adding or removing phases and/or activities to the sets of phases and activities recommended by the system.

Figure 5:
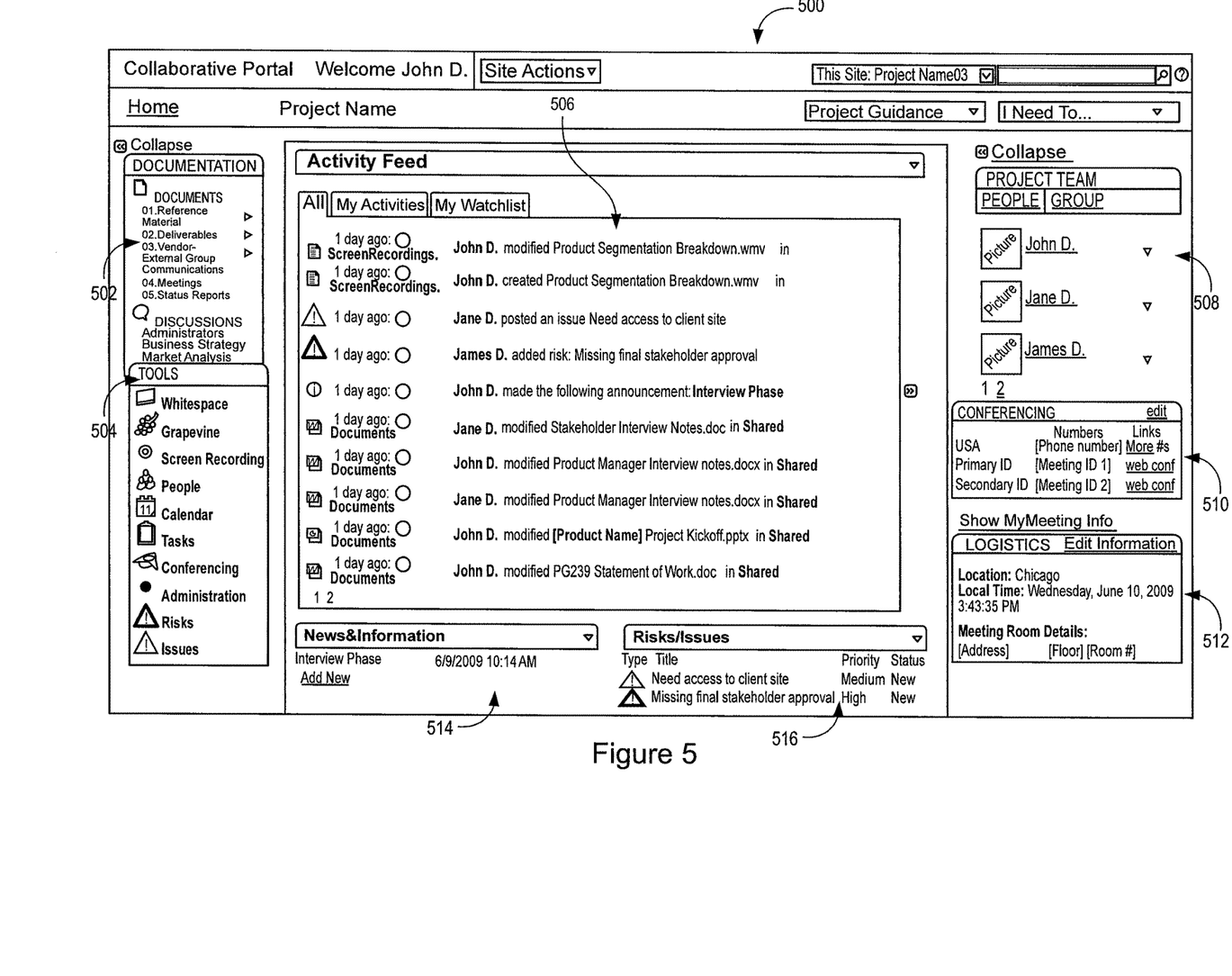
FIG. 5 shows an example of a process-enabled collaborative portal.

Based on the provisioning and customization data, the process-enabled collaboration system generates the process-enabled collaborative portal (212). The process-enabled collaborative portal is a collaboration portal that provides a direct relationship between the activities of a project team and the collaboration tools they will using to complete those activities. The portal also provisions and configures collaboration tools to be used by the project team in completion of the project. FIG. 5, described below, shows an example of a process-enabled collaborative portal.

The process-enabled collaboration system may retrieve profile information about each member of the project team and integrate that profile information into the process-enabled collaborative portal. The profile information may include contact information, a picture, background information, a list of skills, and other information relevant to each member of the project team. The process-enabled collaboration system may retrieve the profile information from a people profiles database. The retrieved profile information may also be stored on the custom project collaboration database and deleted from the custom project collaboration database upon completion of the project, or when a project team member is removed from a project. The profile information may also be updated on a regular basis to keep the information synchronized with people profiles database.

The process-enabled collaboration system may also generate an activity feed on the process-enabled collaborative portal. The process-enabled collaboration system may automatically monitors the collaboration tools used by the team members, as well as other activities of the team members, and presents updates to the project team members in the activity feed.

Figure 7:
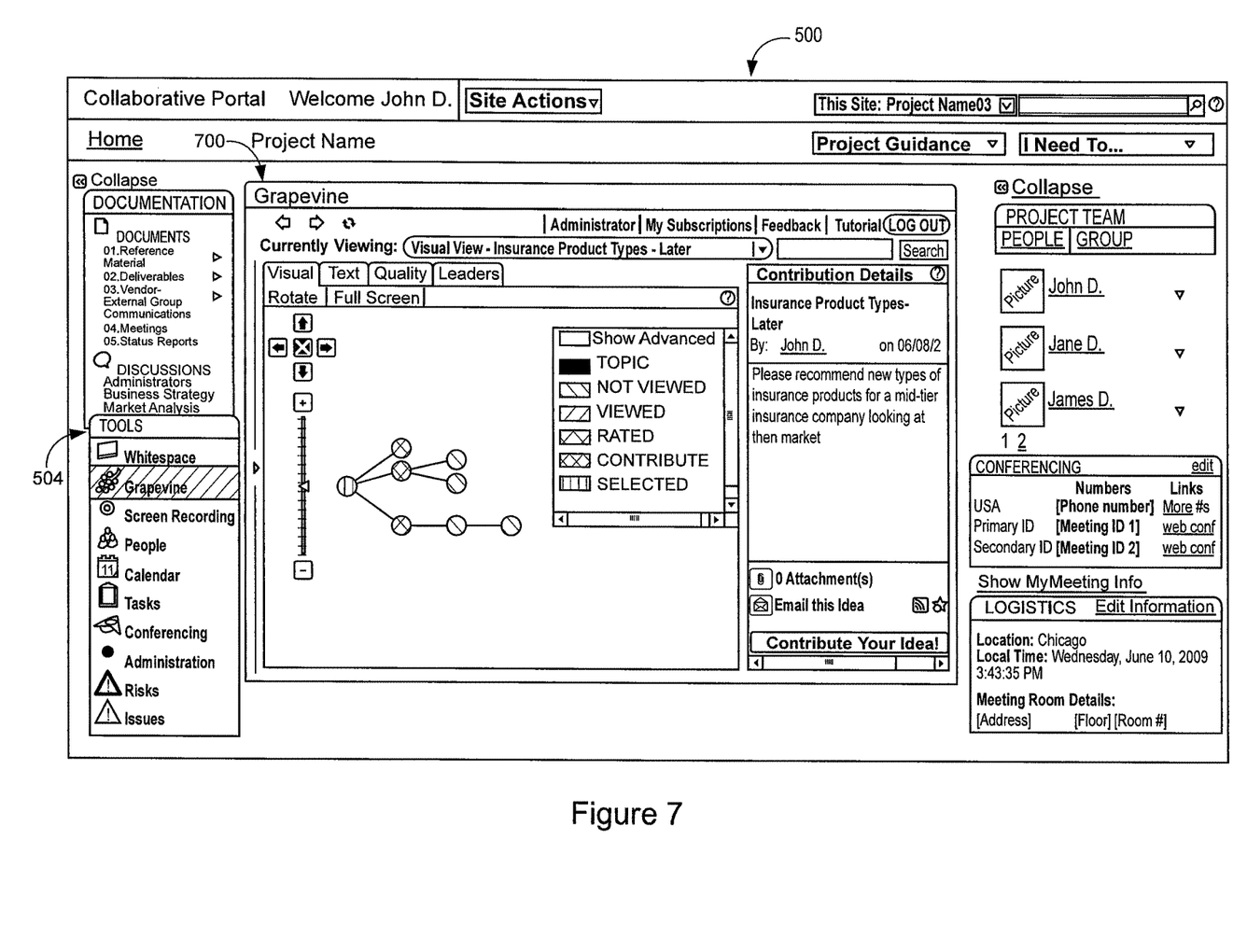
FIG. 7 shows an example of a collaboration tool embedded in the process-enabled collaborative portal.

The process-enabled collaborative portal may include links, buttons, or other mechanisms to access external tools. The process-enabled collaboration system may also embed certain collaboration tools in the process-enabled collaborative portal. FIG. 7, described below, shows an example of a collaboration tool embedded in a process-enabled collaborative portal.

Figure 8:
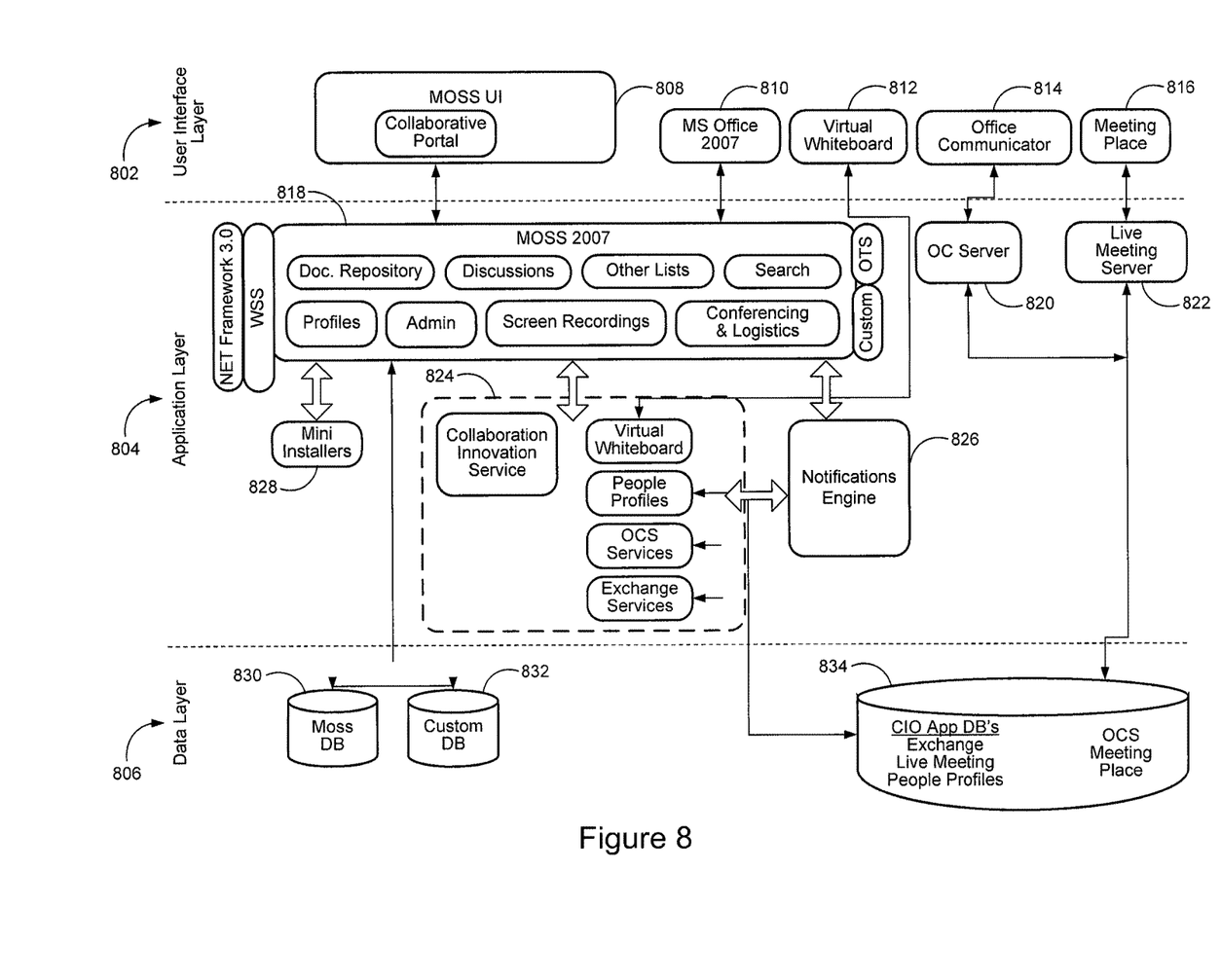
FIG. 8 shows an exemplary architecture for implementing a process-enabled collaboration system.

The process-enabled collaboration system may base the process-enabled collaborative portal on a Microsoft SharePoint platform. FIG. 8, described below, shows an example of an architecture based on a Microsoft Office SharePoint Server (MOSS).

Figure 3:
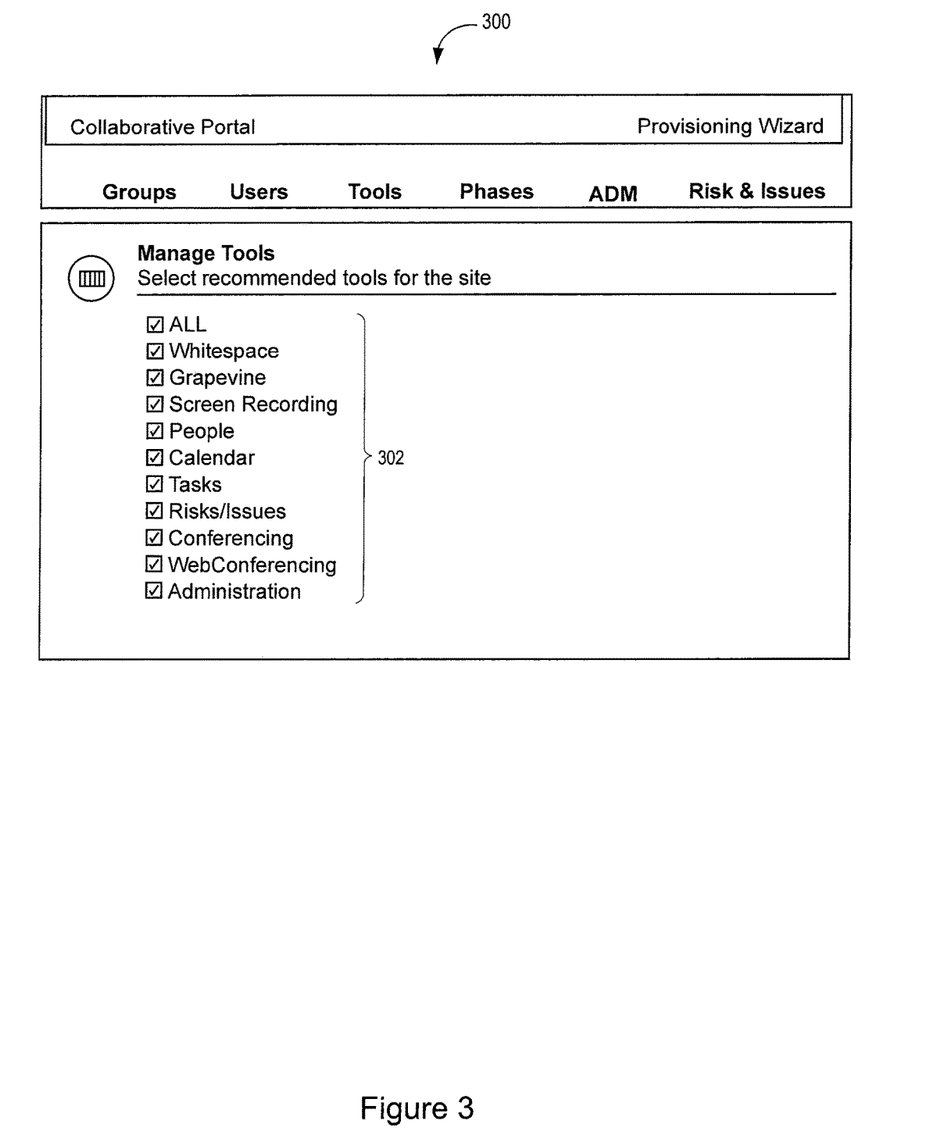
FIG. 3 shows an example of a provisioning wizard page for retrieving collaboration tool customization data.

FIG. 3 shows a portion of a provisioning wizard page 300 through which the process-enabled collaboration system retrieves collaboration tool customization data. The process-enabled collaboration system may present a manager or other user a list of collaboration tools 302 recommended according to the particular project to be performed. As an alternative, the system may present a list of available collaboration tools, with the collaboration tools associated with the particular project checked or otherwise selected. Through checkboxes or other UI elements, the process-enabled collaboration system allows a user to customize the set of collaboration tools to be integrated into the process-enabled collaborative portal.

Figure 4:
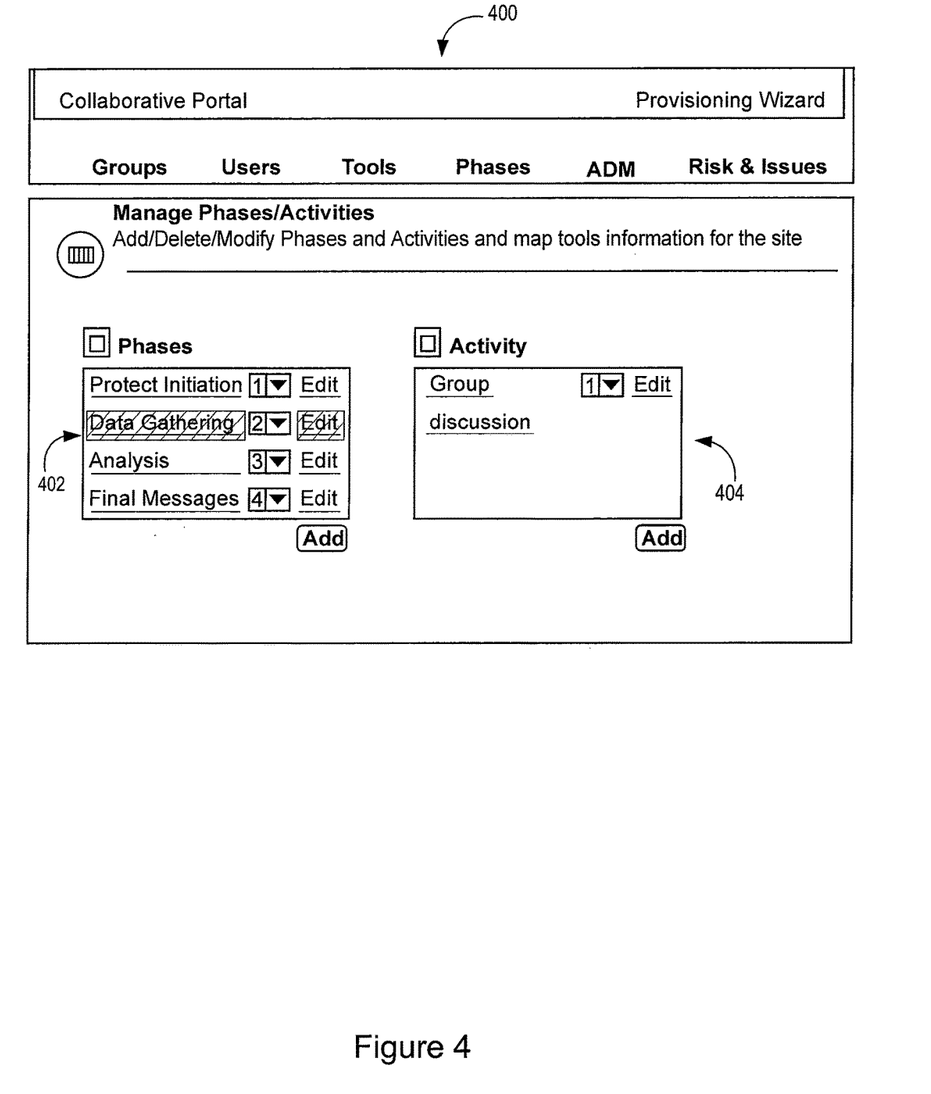
FIG. 4 shows an example of a provisioning wizard page for retrieving phase and activity customization data.

FIG. 4 shows a portion of a provisioning wizard page 400 through which the process-enabled collaboration system retrieves phase and activity customization data. The system may present a user with a list of the phases 402 associated with the project, as well as a list of activities 404 associated with each phase. As discussed above, the list of phases 402 and activities 404 may be different for different projects. The system uses information retrieved from the project template to determine which phases and activities to include in the lists. In FIG. 4, the phases 402 associated with the project to be performed include Project Initiation, Data Gathering, Analysis, and Final Messages. The list of activities shown in FIG. 4 is associated with the Data Gathering phase. Clicking on each phase may show a different set of activities. The system allows the user to add, delete, or modify the phases or activities, as well as collaboration tools associated with the phases or activities, for a particular project.

FIG. 5 shows an example of a process-enabled collaborative portal 500 generated by a process-enabled collaboration system. The process-enabled collaborative portal includes sections related to documentation 502, collaboration tools 504, an activity feed 506, the project team 508, conferencing 510, logistics 512, news/information 514 and risk/issues 516.

The documentation section 502 includes links to documentation relevant to the project, or related to the particular phase/activity of the project. The documentation may include instructional documents, such as documentation on how to use the collaboration tools, documents generated by members of the project team, document templates, or other documentation. The documentation integrated into the process-enabled collaborative portal may be stored in a custom project collaboration database, or stored and accessed externally. The project templates associated with each type of project may include an identification of the documentation to be integrated into the process-enabled collaborative portal such that when the manager or other user identifies the type of project to be performed, a process-enabled collaboration system automatically knows what documentation to pull into the process-enabled collaborative portal.

The collaboration tools section 504 includes links to the collaboration tools integrated into the process-enabled collaborative portal 500. The collaboration tools may be embedded into the process-enabled collaborative portal 500, or may be external tools called through the process-enabled collaborative portal 500.

The activity feed section 506 includes a list of project activity for each project team member. The process-enabled collaboration system may include a notifications engine that pulls update feeds from each of the collaboration tools and pushes the update information into the activity feed on the process-enabled collaborative portal. The process-enabled collaboration system may filter/sort the activity feed information according to each project team member according to the team member's permissions, responsibilities, etc.

The project team section 508 includes profile information about each member of the team, including a picture, contact information, location, skills, role on the team, background, and other information about each team member. The process-enabled collaboration system may pull the profile information from a people profiles database that stores profile information about, for example, a set of potential experts or project team members. The profile information may also include an identification of whether a particular project team member is logged in to a live messenger service, such as Office Communicator. When the project team is set for a particular project, the process-enabled collaboration system pulls the relevant profile information and integrates it into the process-enabled collaborative portal 500.

The conferencing section 510 includes conferencing protocols and information needed to conference two or more members of the project team. The Conferencing information may include telephone conference numbers, links to web conferencing tools, and other conferencing information. The conferencing information relevant to a project team may depend on the locations of each team member. The process-enabled collaboration system may automatically populate the conferencing information into the process-enabled collaborative portal 500 based on the location of each team member. The location of a team member may be determined from the team member's profile. Conferencing information associated with each location, or with each individual may be stored in a database, retrieved by the process-enabled collaboration system, and integrated into the process-enabled collaborative portal 500. The logistics section 512 includes meeting and location information related to team meetings, conferences, or other team gatherings.

The news/information section 514 may include notices and announcements related to the project, or related to the current phase or activity of the project, such as announcements about trainings or meetings, notices about new documentation, notices about a change to the project team, or other such announcements or notices. Data presented in the news/information section 514 may be manually entered by a project team member. News/information data may also be automatically presented in the section 514. For example, if a member of the project team is deleted from the project team section 508, a notice of the change may automatically be presented in the news/information section 514. Changes to other sections of the process-enabled collaborative portal 500, such as to documentation, logistics, conferencing, etc. may also result in automatic notices in the news/information section 514.

The risks/issues section 516 includes a list of important tasks, deadlines, or events, along with a priority rating. This list may be generated by project team members, or may be automatically generated by the process-enabled collaboration system. The project template from which the process-enabled collaborative portal is generated includes information identifying phases and activities for a particular project.

The project template may also include a list of tasks or activities that should be completed during a particular phase or activity, along with a default priority rating for each task or activity. The process-enabled collaboration system may display in the risks/issues section the tasks or activities related to the current phase or activity. As a task or activity is completed, the risks/issues section 516 is updated.

Figure 6:
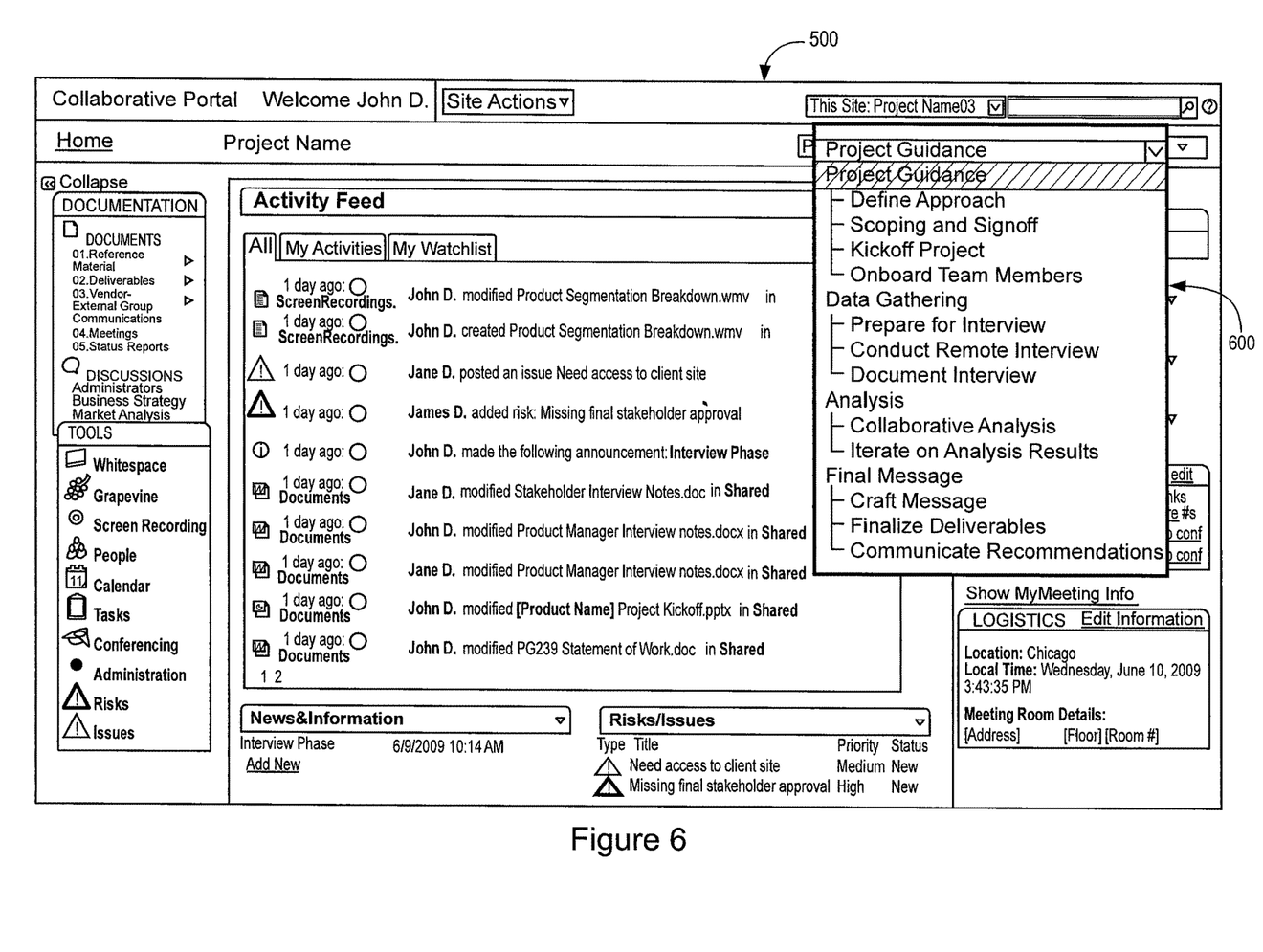
FIG. 6 shows a project guidance section of the process-enabled collaborative portal.

FIG. 6 shows a project guidance section 600 of the process-enabled collaborative portal 500. The project guidance section 600 includes a list of the phases of the project, as well as the activities of each phase. The process-enabled collaborative portal 500 may be customized based on the current activity. For example, the process-enabled collaborative portal is configured to present or highlight information/content that is relevant to the activity or task at hand. If a project team member selects a particular task, the process-enabled collaborative portal provides the user with contextual help to explain how to accomplish the task, and a list of tools associated with that task. In addition, content within the process-enabled collaborative portal may be filtered or displayed based on the task or activity being performed.

FIG. 7 shows an example of a collaboration tool embedded in the process-enabled collaborative portal 500. In this example, the embedded collaboration tool corresponds to a collaboration innovation service tool, such as a grapevine tool that fosters collaborative brainstorming, problem-solving, and decision making within the project team. The collaboration innovation service tool may also assist project teams in collecting input, driving dialogue, and achieving consensus. The collaboration tools section 504 may include links that call up the collaboration tool within the process-enabled collaborative portal environment. In this example, the project team member is able to use an embedded collaboration innovation service tool (e.g., a grapevine tool) within the process-enabled collaborative portal 500. The process-enabled collaborative portal 500 provides quick access to the collaboration tools at a single location.

FIG. 8 shows an exemplary architecture 800 for implementing a process-enabled collaboration system on a MOSS platform. The architecture 800 may include a user interface (UI) layer 802, an application layer 804, and a data layer 806. The UI layer 802 includes a MOSS based interface 808. The MOSS UI 808 supports a process-enabled collaborative portal. The MOSS UI 808 layer may also support other user interface portals, such as the provisioning wizard used to provision a process-enabled collaborative portal. FIGS. 3 and 4 show examples of pages from a provisioning wizard site.

The UI layer 802 may also include interfaces corresponding to each of the collaboration tools 810-816 integrated by the process-enabled collaboration system into the process-enabled collaborative portal. The collaboration tools 810-816 represent an example of the set of collaboration tools integrated by the process-enabled collaboration system. Other collaboration tools may be used for the process-enabled collaborative portal. For example, while the architecture 800 shows an Office Communicator tool 814 and a Meeting Place tool 816, other instant messaging and web conferencing services may be used, respectively. The process-enabled collaboration system is configured to integrate a variety of different sets of collaboration tools based on the project being performed.

The application layer 804 may include a Microsoft Office SharePoint Server (MOSS) 818. In the architecture 800 shown in FIG. 8, the process-enabled collaboration system is based on MOSS 2007. It will be appreciated that earlier or subsequent versions of MOSS may be used. The MOSS 818 may include a variety of tools (e.g., Doc. Repository, Discussions, etc.) that facilitate easy access to resources users may need to perform the relevant client services. The tools may be out-of-the-box MOSS tools, or may be customized according to the specifications of the process-enabled collaboration system. For example, the custom tool may include custom Word templates, such as a scope document. The virtual Whiteboard collaboration tool 812 may be configured for status meetings or for performing a root cause analysis.

The application layer 804 may also include servers that support one or more of the collaboration tools 810-816. For example, FIG. 8 shows an OC Server 820 that supports the Office Communicator tool 814, and a Meeting Place Server 822 that supports the Meeting Place tool 816.

The application layer 804 may include a set 824 of adapters corresponding to tools or applications integrated by and called during the use of the process-enabled collaboration system. For example, the set 824 of adapters includes an adapter corresponding to the virtual whiteboard tool 812. The Collaboration Innovation Service adapter corresponds to a virtual brainstorming tool that allows users to crowd-source responses to a question that they may have.

Figure 9:
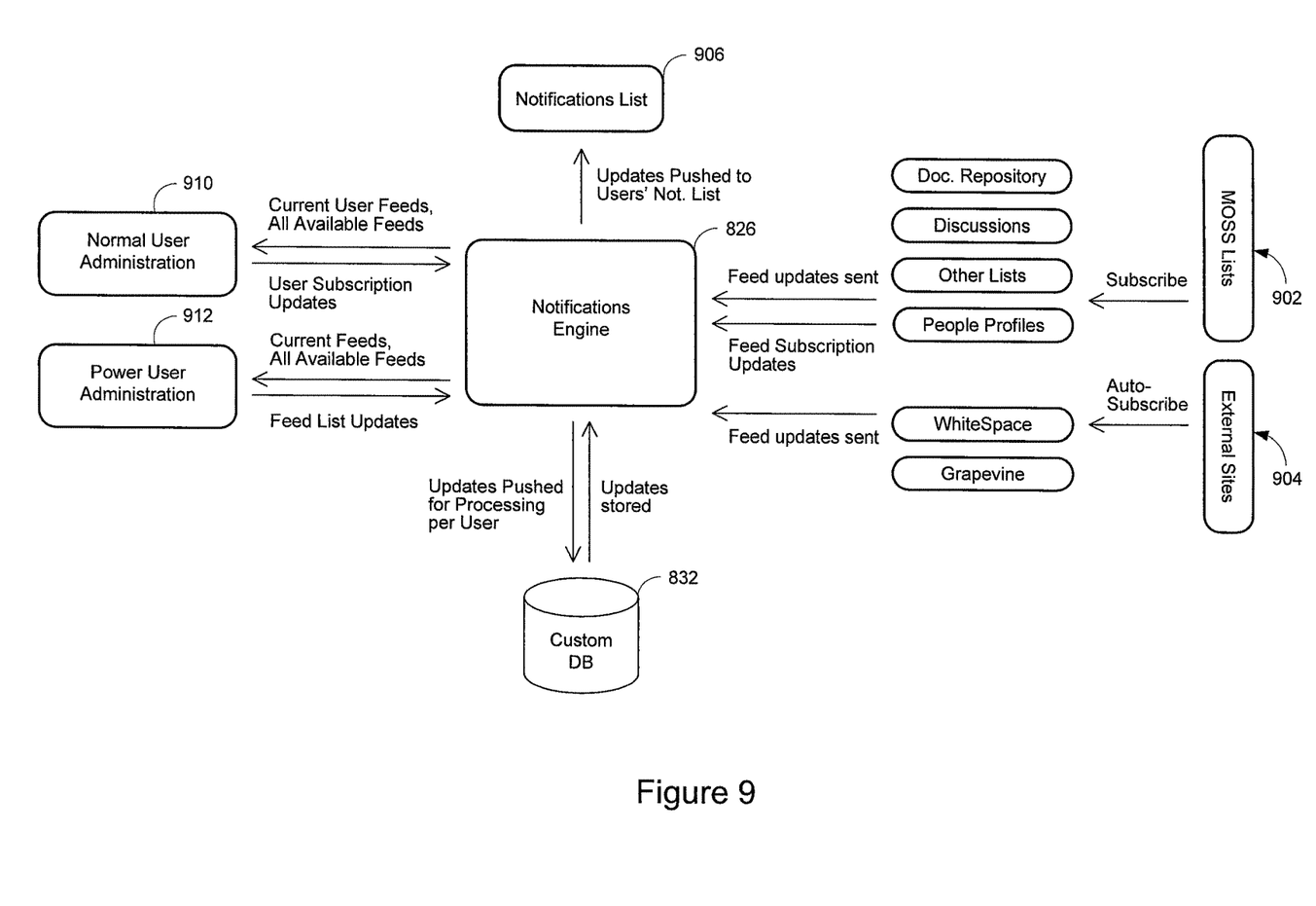
FIG. 9 shows an example of the dataflow corresponding to a notifications engine.

The application layer 804 includes a notifications engine 826 that monitors activities in MOSS and in the collaboration tools. The notification engine 826 may be a back-end collector service that receives feed updates from MOSS and external tools and pushes those updates to a user's notification list. The feed updates may include a list of changes to the customization tools. The content of a user's notification list may be presented to the user at the process-enabled collaborative portal as part of an activity feed. The notifications engine may filter the activity information that is presented to each user according to such factors as the user's permissions or responsibilities. FIG. 9, described below, shows a an example of the dataflow corresponding to the notifications engine 826.

The application layer 804 may also include mini-installers 828 that help the disparate collaboration tools and applications communicate and exchange information within the process-enabled collaborative portal. The mini-installers provide personalized installations to the client machines. For example, if the team selects that they are using Office Communicator, upon site, or portal, creation, a mini-installer is created that will check to see if OC is installed on the users' machine and add a group that represents the project team. In another example, when a user is added to a project site, a mini-installer is created and sent to them that automatically connects the project calendar to their outlook client.

The data layer 806 includes a MOSS database 830, a Custom project collaboration database 832, and application databases 834. The application databases 834 correspond to the various applications and collaboration tools used for a particular project. The custom project collaboration database 832 stores templates corresponding to the various projects the process-enabled collaboration system supports. Each project template includes information identifying the phases and activities of a project. For example, a Strategy project may include four phases, while a Supply Chain project may include seven phases. There may also be different collaboration tools associated with each phase. The project template includes an identification of the collaboration tools needed for a project, as well as for each phase within the project. The project template may also include information identifying documentation, tasks, events, or other data associated with a project. As a project progresses from one phase to another, the process-enabled collaboration system may use the project template information to present users with instructions or notices with respect to the collaboration tools that are applicable for that phase. The process-enabled collaboration system may also use project template information to dynamically configure the collaboration tools with templates (e.g., document templates) or other customizations that are relevant to the particular phase or activity being performed. The custom project collaboration database 832 may store feed updates collected by the notification engine 826.

FIG. 9 shows an example of the dataflow corresponding to the notifications engine 826. The notifications engine 826 may receive feed updates from various MOSS lists 902, as well as feed updates from collaboration tools supported at external sites 904. The notifications engine 826 may also receive feed subscription updates from the MOSS lists 902.

The notifications engine 826 may store the feed updates and feed subscription updates in the custom project collaboration database 832. The notifications engine 826 may also push the feed updates to a user's notification list 906. The notification list 906 includes the activity data displayed in the user's activity feed, such as the activity feed 506 of FIG. 5. The notifications engine 826 may also filter the activity data pushed to the notification lists 906 according to factors such as a user's permissions and responsibilities. For example, the activity feed of a team manager may include more or different information than a team analyst.

The notifications engine 826 may also allow users some administrative control over the feeds they receive. For example, a normal user administrative protocol 910 allows the user to set which of the available feeds are pushed to his/her notifications list. A power user administrative protocol 912 may allow a user with sufficient permissions to control which collaboration tools to receive feed updates from, such as by modifying which MOSS lists to request a feed update from.

Figure 10:
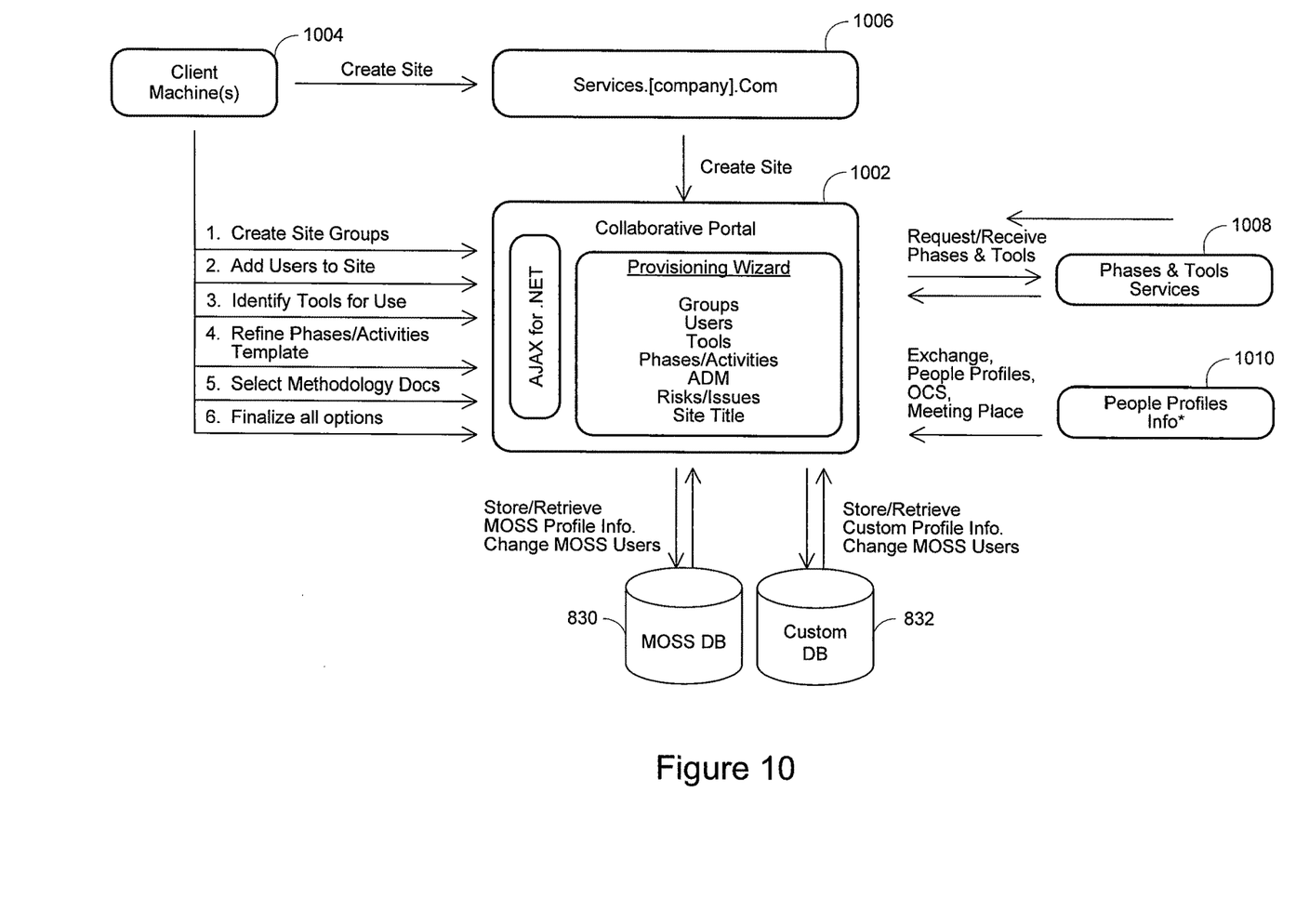
FIG. 10 shows an example of the dataflow corresponding to creating a process-enabled collaborative portal.

FIG. 10 shows an example of the dataflow corresponding to creating a process-enabled collaborative portal 1002. A client machine 1004 (corresponding to, e.g., a site creator) submits a site provisioning request to a company services application 1006 that calls the server to create a new process-enabled collaborative portal. The client machine 1004 then submits, through a provisioning wizard interface, information needed to customize the process-enabled collaborative portal 1002. The information may include group and user information, an identification of collaboration tools, refinement of the phases/activities of the project, an identification of relevant documentation, and other options related to customizing the process-enabled collaborative portal. The process-enabled collaborative portal communicates with the MOSS database 830 and the custom project collaboration database 832. Through the MOSS database 830 the MOSS profile information may be stored/retrieved, and the list of MOSS users may be changed. Through the custom project collaboration database 832 user profile information may be stored/retrieved/modified.

The process-enabled collaborative portal 1002 requests and retrieves information 1008 related to the phases and/or collaboration tools relevant to a particular phase or activity being performed. The process-enabled collaborative portal 1002 also requests and retrieves people profile information 1010. Block 1008 represents a subset of the application that manages the phases/activities/tools templates and state for all of the projects on the process-enabled collaborative portal. Block 1010 represents a profile management application, such as Facebook, LinkedIn, a company's internal Personal profiles service, or other profile management service.

Exemplary aspects, features, and components of the system are described above. However, the system may be implemented in many different ways. For example, although some features are shown stored in computer-readable memories (e.g., as logic implemented as computer-executable instructions or as data structures in memory), all or part of the system and its logic and data structures may be stored on, distributed across, or read from other machine-readable media. The media may include hard disks, floppy disks, CD-ROMs, a signal, such as a signal received from a network or received over multiple packets communicated across the network.

The system may be implemented with additional, different, or fewer components. As one example, a processor may be implemented as a microprocessor, a microcontroller, a DSP, an application specific integrated circuit (ASIC), discrete logic, or a combination of other types of circuits or logic. As another example, memories may be DRAM, SRAM, Flash or any other type of memory. The processing capability of the system may be distributed among multiple components, such as among multiple processors and memories, optionally including multiple distributed processing systems. Parameters, databases, and other data structures may be separately stored and managed, may be incorporated into a single memory or database, may be logically and physically organized in many different ways, and may implemented with different types of data structures such as linked lists, hash tables, or implicit storage mechanisms. Logic, such as programs or circuitry, may be combined or split among multiple programs, distributed across several memories and processors, and may be implemented in a library, such as a shared library (e.g., a dynamic link library (DLL)). The DLL, for example, may store code that prepares intermediate mappings or implements a search on the mappings. As another example, the DLL may itself provide all or some of the functionality of the system, tool, or both.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

What is claimed is:

1. A method for configuring a server platform comprising a database and a collaboration portal system,
    wherein the collaboration portal system is in communication with the database and client machines through a communication network and comprising:
        a user interface layer implementing a customized electronic collaboration interface displaying a variety of different sets of collaboration tools dynamically identified and integrated;
        an application layer comprising:
            servers that support one or more of the collaboration tools included in the user interface layer;
            a set of adapters corresponding to the collaboration tools or applications integrated by and called during the use of the collaboration portal system;
            a notification engine that monitors activities in the applications and the collaboration tools by receiving feed updates from the collaboration tools and the applications and externally and filtering activity information to be presented to users; and an installer that operates to coordinate the collaboration tools and the applications and provide personalized installations to the client machines, wherein the installer is configured to install on the client machines collaboration tools corresponding to a current project type, a current phase, or a current activity, that are absent on the client machines and to automatically connect the installed collaboration tools with previously existing collaboration tools or applications on the client machines;

wherein the collaboration portal system comprises a processor and a computer-readable medium that stores instructions, the method comprising executing the instructions stored on the computer-readable medium that cause the processor to:

receive a first project type identifying a project to be performed from a client machine;

receive provisioning data associated with the first project type from the client machine;

identify a first project template that corresponds to the first project type from among multiple project templates stored in a database, wherein the first project template comprises:
an identification of phases associated with the first project type;
an identification of activities associated with each phase; and
an identification of collaboration tools associated with the first project type;

integrate collaboration tools corresponding to the first project template as corresponding to a first phase of the first project type and a first activity of the first phase into a single electronic collaboration user interface;

customize the electronic collaboration user interface to the first activity and the first phase of the project to be performed;

upon receiving an indication that the first project type has been activated by a new client machine, install a first set of the collaboration tools corresponding to the first project type absent on the new client machine and automatically connect with a second set of the collaboration tools present on the new client machine;

identify when the project has moved to one of the subsequent activities of the first phase or to one of the subsequent phases of the first project type;

dynamically identify and integrate the collaboration tools corresponding to each subsequent activity of the first phase and to each subsequent phase into the electronic collaboration user interface when the project moves to the subsequent activities or subsequent phases, respectively;

dynamically customize, as the project moves to one of the subsequent activities of the first phase or one of the subsequent phases of the first project type, the electronic collaboration user interface to each subsequent activity of the first phase and to each subsequent phase of the first project type, respectively;

upon receiving an indication that a progress to one of the subsequent activities of the first phase or one of the subsequent phases of the first project type, has been activated by two or more of client machines, retrieve, from the first project template, collaboration tools information linked to an activated subsequent activity or an activated phase of the first project type; and further customize the electronic collaboration user interface, based on the retrieved collaboration tools information, to activate and display a third set of the collaboration tools absent on the previously customized electronic collaboration user interface and suppress a fourth set of the collaboration tools present on the previously customized electronic collaboration user interface.

2. The method of claim 1, wherein the instructions stored on the computer-readable medium further cause the processor to:
receive activity updates from the collaboration tools; and
display the activity updates in an activity feed section of the electronic collaboration user interface.

3. The method of claim 2, wherein the instructions stored on the computer-readable medium further cause the processor to:
filter the activity updates based on a user profile of a user accessing the electronic collaboration user interface; and
display the filtered activity updates.

4. The method of claim 1, wherein the instructions stored on the computer-readable medium further cause the processor to:
track a current activity; and
customize the electronic collaboration user interface to the current activity.

5. The method of claim 1, wherein the instructions stored on the computer-readable medium further cause the processor to obtain user profile information associated with each member of a project team.

6. The method of claim 5, wherein the instructions stored on the computer-readable medium further cause the processor to display the user profile information in a project team section of the electronic collaboration user interface.

7. The method of claim 5, wherein the electronic collaboration interface further comprises a conferencing section identifying conferencing protocols and information for the project team.

8. The method of claim 7, wherein the instructions stored on the computer-readable medium further cause the processor to display the conferencing protocols and information in the conferencing section based on a location of each member of the project team.

9. A product comprising:
a database comprising a collaboration database and an application database,
wherein the collaboration database stores multiple project templates, wherein each project template corresponds to a different project type and comprises:
an identification of phases associated with the corresponding project type;
an identification of activities associated with each phase; and
an identification of collaboration tools associated with the corresponding project type and with each phase of the corresponding project type and with each activity of the corresponding phase; and
the application database stores information corresponding to applications and collaboration tools used for a particular project;
a collaboration portal system in communication with the database and client machines through a communication network and comprising:
a user interface layer implementing a customized electronic collaboration interface displaying a variety of different sets of collaboration tools dynamically identified and integrated;

an application layer comprising:
servers that support one or more of the collaboration tools included in the user interface layer;
a set of adapters corresponding to the collaboration tools or applications integrated by and called during the use of the collaboration portal system;
a notification engine that monitors activities in the applications and the collaboration tools by receiving feed updates from the collaboration tools and the applications and externally and filtering activity information to be presented to users; and
an installer that operates to coordinate the collaboration tools and the applications and provide personalized installations to the client machines, wherein the installer is configured to install on the client machines collaboration tools corresponding to a current project type, a current phase, or a current activity, that are absent on the client machines and to automatically connect the installed collaboration tools with previously existing collaboration tools or applications on the client machines;
a computer-readable medium; and
programmable instructions stored on the computer-readable medium that, when executed, cause a processor in the collaboration portal system to:
receive a first project type identifying a project to be performed;
receive provisioning data associated with the first project type;
identify a first project template that corresponds to the first project type from among the multiple project templates stored in the database, wherein the first project template comprises:
an identification of phases associated with the first project type;
an identification of activities associated with each phase; and
an identification of collaboration tools associated with the first project type;
integrate collaboration tools corresponding to the first project template as corresponding to a first phase of the first project type and a first activity of the first phase into a single electronic collaboration user interface;
customize the electronic collaboration user interface to the first activity and the first phase of the project to be performed;
identify when the project has moved to one of the subsequent activities of the first phase or to one of subsequent phases of the first project type;
dynamically identify and integrate the collaboration tools corresponding to each subsequent activity of the first phase and to each subsequent phase into the electronic collaboration user interface when the project moves to the subsequent activities or subsequent phases, respectively;
dynamically customize, as the project moves to one of the subsequent activities of the first phase or one of the subsequent phases of the first project type, the electronic collaboration user interface to each subsequent activity of the first phase and to each subsequent phase of the first project type, respectively;
upon receiving an indication that the first project type has been activated by a new client machine, install a first set of the collaboration tools corresponding to the first project type absent on the new client machine and automatically connect with a second set of the collaboration tools present on the new client machine;
upon receiving an indication that a progress to one of the subsequent activities of the first phase or one of the subsequent phases of the first project type, has been activated by two or more of client machines, retrieve, from the first project template, collaboration tools information linked to an activated subsequent activity or an activated phase of the first project type; and
further customize the electronic collaboration user interface, based on the retrieved collaboration tools information, to activate and display a third set of the collaboration tools absent on the previously customized electronic collaboration user interface and suppress a fourth set of the collaboration tools present on the previously customized electronic collaboration user interface.

10. The product of claim 9, further comprising instructions that, when executed, cause the processor to:
receive activity updates from the collaboration tools; and
display the activity updates in an activity feed section of the electronic collaboration user interface.

11. The product of claim 10, further comprising instructions that, when executed, cause the processor to:
filter the activity updates based on a user profile of a user accessing the electronic collaboration user interface; and
display the filtered activity updates.

12. The product of claim 9, further comprising instructions that, when executed, cause the processor to:
track a current activity; and
customize the electronic collaboration user interface to the current activity.

13. The product of claim 9, further comprising instructions that, when executed, cause the processor to obtain user profile information associated with each member of a project team.

14. The product of claim 13, further comprising instructions that, when executed, cause the processor to display the user profile information in a project team section of the electronic collaboration user interface.

15. The product of claim 13, wherein the electronic collaboration user interface further comprises a conferencing section identifying conferencing protocols and information for the project team.

16. The product of claim 15, further comprising instructions that, when executed, cause the processor to display the conferencing protocols and information in the conferencing section based on a location of each member of the project team.

17. A server platform for implementing an electronic collaboration enablement system, comprising:
a database comprising a collaboration database and an application database,
wherein the collaboration database storing multiple project templates, wherein each project template corresponds to a different project type and comprises:
an identification of phases associated with the corresponding project type;
an identification of activities associated with each phase; and
an identification of collaboration tools associated with the corresponding project type and with each phase of the corresponding project type and with each activity of the corresponding phase; and the application database storing information corresponding to applications and collaboration tools used for a particular project;
a collaboration portal system in communication with the database and client machines through a communication network and comprising:
 a user interface layer implementing a customized electronic collaboration interface displaying a variety of different sets of collaboration tools dynamically identified and integrated;
 an application layer comprising:
  servers that support one or more of the collaboration tools included in the user interface layer;
  a set of adapters corresponding to the collaboration tools or applications integrated by and called during the use of the collaboration portal system;
  a notification engine that monitors activities in the applications and the collaboration tools by receiving feed updates from the collaboration tools and the applications and externally and filtering activity information to be presented to users; and
  an installer that operates to coordinate the collaboration tools and the applications and provide personalized installations to the client machines, wherein the installer is configured to install on the client machines the collaboration tools corresponding to a current project type, a current phase, or a current activity, that are absent on the client machines and to automatically connect the installed collaboration tools with previously existing collaboration tools or applications on the client machines;
wherein the collaboration portal system further comprises a processor and a memory coupled to the processor, the memory storing instructions that, when executed, cause the processor to:
 receive a first project type identifying a project to be performed;
 receive provisioning data associated with the first project type;
 identify a first project template from among the multiple project templates that corresponds to the first project type;
 identify, from the first project template, a set of phases corresponding to the first project type, the set of phases comprising a first phase and subsequent phases, wherein the set of activities associated with the first phase comprises a first activity and subsequent activities;
 integrate collaboration tools corresponding to the first project template as corresponding to the first phase of the first project type and the first activity of the first phase into a single electronic collaboration user interface;
 customize the electronic collaboration user interface to the first activity and the first phase of the project to be performed;
 identify when the project has moved to one of the subsequent activities of the first phase or to one of subsequent phases of the first project type;
 dynamically identify and integrate the project management electronic collaboration tools corresponding to each subsequent activity of the first phase and to each subsequent phase into the electronic collaboration user interface when the project moves to the subsequent activities or subsequent phases, respectively; and
 dynamically customize, as the project moves to one of the subsequent activities of the first phase or one of the subsequent phases of the first project type, the electronic collaboration user interface to each subsequent activity of the first phase and to each subsequent phase of the first project type, respectively;
wherein the collaboration portal system operates to:
 upon receiving an indication that the first project type has been activated by a new client machine, install a first set of the collaboration tools corresponding to the first project type absent on the new client machine and automatically connect with a second set of the collaboration tools present on the new client machine;
 upon receiving an indication that a progress to one of the subsequent activities of the first phase or one of the subsequent phases of the first project type, has been activated by two or more of the client machines, retrieve, from the first project template, collaboration tools information linked to an activated subsequent activity or an activated phase of the first project type; and
 further customize the electronic collaboration user interface, based on the retrieved collaboration tools information, to activate and display a third set of the collaboration tools absent on the previously customized electronic collaboration user interface and suppress a fourth set of the collaboration tools present on the previously customized electronic collaboration user interface.

18. The system of claim 17, further comprising instructions that, when executed, cause the processor to:
 receive activity updates from the collaboration tools corresponding to the first project template; and
 display the activity updates in the electronic collaboration user interface.

19. The system of claim 18, further comprising instructions that, when executed, cause the processor to:
 filter the activity updates based on a user profile of a user accessing the electronic collaboration user interface; and
 display the filtered activity updates.

20. The system of claim 17, further comprising instructions that, when executed, cause the processor to:
 track a current activity; and
 customize the electronic collaboration user interface to the current activity.

21. The system of claim 17, further comprising instructions that, when executed, cause the processor to obtain user profile information associated with each member of a project team, wherein the electronic collaboration user interface comprises a project team section identifying the members of the project team.

22. The system of claim 21, further comprising instructions that, when executed, cause the processor to display the user profile information in the project team section of the electronic collaboration user interface.

23. The system of claim 21, wherein the electronic collaboration user interface further comprises a conferencing section identifying conferencing protocols and information for the project team.

24. The system of claim 23, further comprising instructions that, when executed, cause the processor to display the conferencing protocols and information in the conferencing section based on a location of each member of the project team.

* * * * *